US009570953B2

(12) United States Patent
Sato et al.

(10) Patent No.: US 9,570,953 B2
(45) Date of Patent: Feb. 14, 2017

(54) ROTARY ELECTRIC MACHINE

(71) Applicant: Mitsubishi Electric Corporation, Chiyoda-ku, Tokyo (JP)

(72) Inventors: Soichi Sato, Tokyo (JP); Masaya Inoue, Tokyo (JP); Koichi Ojima, Tokyo (JP); Keigo Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 468 days.

(21) Appl. No.: 14/222,035

(22) Filed: Mar. 21, 2014

(65) Prior Publication Data

US 2015/0108877 A1    Apr. 23, 2015

(30) Foreign Application Priority Data

Oct. 23, 2013   (JP) ................................ 2013-219846

(51) Int. Cl.
*H02K 5/16*       (2006.01)
*H02K 5/173*      (2006.01)
*H02K 7/08*       (2006.01)

(52) U.S. Cl.
CPC ............ *H02K 5/1732* (2013.01); *H02K 7/083* (2013.01); *H02K 11/01* (2016.01); *H02K 5/16* (2013.01); *H02K 5/161* (2013.01)

(58) Field of Classification Search
CPC .......... H02K 5/16; H02K 5/161; H02K 5/173; H02K 5/1732; H02K 7/083; H02K 11/01; F16C 35/077; F16C 35/067
USPC ........................................................ 310/425
See application file for complete search history.

(56) References Cited

U.S. PATENT DOCUMENTS

| 5,087,847 A * | 2/1992 | Giesbert ................. F02M 3/07 267/161 |
| 6,661,141 B1 * | 12/2003 | Omi ........................ F16C 19/54 310/90 |
| 2007/0103019 A1 * | 5/2007 | Nakano ................ H02K 5/1732 310/90 |

FOREIGN PATENT DOCUMENTS

| JP | 1-116219 U | 8/1989 |
| JP | 1-121159 U | 8/1989 |
| JP | H01116219 U * | 8/1989 |
| JP | 2000-134860 A | 5/2000 |
| JP | 2000-156952 A | 6/2000 |
| JP | 3635948 B2 | 4/2005 |

(Continued)

OTHER PUBLICATIONS

Machine translation of JP 2008148453 A.*

(Continued)

*Primary Examiner* — Quyen Leung
*Assistant Examiner* — Minki Chang
(74) *Attorney, Agent, or Firm* — Sughrue Mion, PLLC; Richard C. Turner

(57) ABSTRACT

A rotary electric machine includes: a stator around which a coil is wound; a frame which fixes the stator; a rotor which faces the stator via a slight air gap; a shaft which is fixed to the rotor and is rotatably and removably supported via a bearing; and a bracket which supports the bearing inside a bearing box. The rotary electric machine includes: an insulating member which is mounted inside the bearing box of the bracket; a metal holder which is mounted inside the insulating member with a predetermined clearance with respect to an outer ring of the bearing, and supports the bearing; and a pressing body which is mounted between the side surface of the metal holder and the side surface of the outer ring of the bearing.

20 Claims, 6 Drawing Sheets

(56) References Cited

FOREIGN PATENT DOCUMENTS

| JP | 2008-082415 A | | 4/2008 |
|----|---------------|---|--------|
| JP | 2008082415 A | * | 4/2008 |
| JP | 2008-148453 A | | 6/2008 |
| JP | 2008148453 A | * | 6/2008 |

OTHER PUBLICATIONS

Machine translation of JP H01116219 U.*
Machine translation of JP 2008082415 A.*
Communication dated Nov. 4, 2014, issued by the Japanese Patent Office in counterpart Japanese application No. 2013-219846.

* cited by examiner

ROTARY ELECTRIC MACHINE

BACKGROUND OF THE INVENTION

1. Field of the Invention

The present invention relates to a rotary electric machine for use in, for example, for an electric vehicle (EV) or for a hybrid electric vehicle (HEV) and, more particularly, relates to the retaining structure of a bearing.

2. Description of the Related Art

As a conventional rotary electric machine for use in for an electric vehicle (EV) or for a hybrid electric vehicle (HEV), in the case where the carrier frequency of an inverter is set to be high in the case of operating the inverter, voltage (axis voltage) generated in a shaft of an alternating-current motor on the basis of high-frequency induction increases, a potential difference present between an inner ring and an outer ring of a bearing that supports a shaft increases, and an electric current flows in the bearing.

A problem exists in that the current flowing in the bearing causes corrosion referred to as electrolytic corrosion on both inner ring and outer ring tracks and on the rolling surfaces of rolling elements, and accordingly durability of a rolling bearing deteriorates.

Furthermore, a preload is applied on the bearing by a wave washer or a coned disc spring in the rotary electric machine; and thus, an axial backlash is closed to raise rigidity of the bearing and noise due to vibration is prevented.

As the conventional rotary electric machine, for example, there is one as shown in FIG. 10 and FIG. 11. In FIG. 10, reference numeral 41b denotes a rotary electric machine of a fan driving electric motor; and the rotary electric machine has a motor case 42 and a shaft 44 rotatably supported inside the motor case 42 via a pair of bearings 43, 43. The motor case 42 is composed of a cylindrical case body (frame) 45, a front cover 46 which covers a front end opening of the case body 45, and a rear cover 47 which covers a rear end opening of the case body 45. 51 denotes an outer ring of the bearing 43; 52 denotes an inner ring of the bearing 43; and 53 denotes rolling elements provided in plural numbers for each between an outer ring track of the inner circumferential surface of the outer ring 51 and an inner ring track of the outer circumferential surface of the inner ring 52. 54 denotes a corrugated plate spring which is held in sandwiched relation between the side surface of the bracket 49 and the end surface of the outer ring 51 of the bearing 43 to press the outer ring 51 toward the other outer ring 51. 55 denotes a rotor; and 56 denotes a stator. 60b denotes an insulating member mounted between the outer ring 51 of the bearing 43 and the bearing box 61b of each of the brackets 48, 49.

FIG. 11 shows details of a bearing portion. The insulating member 60b is fitted inside the bearing box 61b of the bracket 48; and the bearing 43 is supported via the insulating member 60b and thus electrolytic corrosion is prevented. Furthermore, the preload spring 54 such as a wave washer or a coned disc spring is located between the side surface of the outer ring 51 of the bearing 43 and the side surface of the insulating member 60b.

PATENT DOCUMENT

[Patent Document 1] Japanese Examined Patent Publication No. 3635948

The aforementioned conventional rotary electric machine for use in for the EV or for the HEV is wide in use temperature range from a low temperature to a high temperature, and accordingly the following problem is caused due to a change in temperature. The insulating member 60b is made of rubber or resin and is larger in linear expansion coefficient than that of the bearing 43 (iron material). Furthermore, in most cases, the bracket 48 is made of aluminum and is larger in linear expansion coefficient than that of the bearing 43 (iron material). When the temperature becomes high, the amount of expansion of the inner diameter of each of the bracket 48 and the insulating member 60b becomes larger than the amount of expansion of the outer diameter of the outer ring 51 of the bearing 43, and clearance 80 between the outer ring 51 of the bearing 43 and the insulating member 60b becomes large. When the clearance 80 on the outer circumference of the outer ring 51 of the bearing 43 becomes large, the occurrence of creep is conceivable.

When the temperature becomes low, the amount of contraction of the inner diameter of each of the bracket 48 and the insulating member 60b becomes larger than the amount of contraction of the outer diameter of the outer ring 51 of the bearing 43, and the clearance 80 between the outer ring 51 of the bearing 43 and the insulating member 60b disappears. When the clearance 80 on the outer circumference of the outer ring 51 of the bearing 43 disappears, sliding cannot be made between the boundary surface of the insulating member 60b and the outer ring 51 of the bearing 43; and thus, the outer ring 51 of the bearing 43 is retained by the bracket 48 via the insulating member 60b. In contrast, the inner ring 52 of the bearing 43 is retained by the shaft 44. In the case where the linear expansion coefficient of the shaft 44 is different from that of the bracket 48 (the shaft 44 is made of iron material and the bracket 48 is made of aluminum or the like), it is conceivable that relative positions of the shaft 44 and the bracket 48 are deviated by deformation due to a change in temperature, force in which the outer ring 51 and the inner ring 52 of the bearing 43 are axially sheared is applied, and the bearing 43 is broken.

In order to avoid the above-mentioned problem, if the clearance 80 between the outer ring 51 of the bearing 43 and the insulating member 60b is set to be large, the possibility of causing the creep is further increased at the high temperature.

Furthermore, in the case where the clearance 80 exists between the boundary surface of the insulating member 60b and the outer ring 51 of the bearing 43 and the bearing 43 can be axially slid inside the insulating member 60b due to a change in temperature, and when there is the change in temperature, the insulating member 60b (resin or rubber) is lower in hardness than that of the bearing 43; and thus, wear and settling are caused, deformation of the inner diameter of the insulating member 60b is caused, the axis of the shaft 44 is deviated, and this leads to an increase in operating sound and deterioration in durability.

Moreover, a load of the preload spring 54 such as the wave washer or the coned disc spring is received by the insulating member 60b (resin or rubber); and thus, settling of the insulating member 60b is conceivable, the load is lowered by a change in compression length of the preload spring 54 such as the wave washer or the coned disc spring, and this leads to an increase in operating sound.

Additionally, in the case where the bearing 43 is subject to vibration and/or a radial load in a state where the clearance 80 exists on the outer circumferential side of the outer ring 51 of the bearing 43, the bearing 43 beats against the insulating member 60b (resin or rubber) within the clearance 80; and thus, settling of the insulating member 60b is caused, the inner diameter of the insulating member 60b is deformed, axial deviation of the shaft 44 is caused, and this leads to an increase in operating sound and deterioration in durability.

Besides, the insulating member 60b (resin and/or rubber) is lower in processing accuracy as compared to metal; and thus, axial deviation of the shaft 44 becomes larger than the case where the bearing 43 is supported by a metal component, and this leads to an increase in operating sound and deterioration in durability.

SUMMARY OF THE INVENTION

This invention has been made to solve the problem as described above and an object of the present invention is to provide a rotary electric machine capable of suppressing fluctuation of clearance due to a change in temperature.

According to a first aspect of the present invention, there is provided a rotary electric machine including: a stator around which a coil is wound; a frame which fixes the stator; a rotor which faces the stator via a slight air gap; a shaft which is fixed to the rotor and is rotatably and removably supported via a bearing; and a bracket which supports the bearing inside a bearing box. The rotary electric machine includes: an insulating member which is mounted inside the bearing box of the bracket; a metal holder which is mounted inside the insulating member with a predetermined clearance with respect to an outer ring of the bearing, and supports the bearing; and a pressing body which is mounted between the side surface of the metal holder and the side surface of the outer ring of the bearing.

Furthermore, according to a second aspect of the present invention, there is provided a rotary electric machine including: a stator around which a coil is wound; a frame which fixes the stator; a rotor which faces the stator via a slight air gap; a shaft which is fixed to the rotor and is rotatably and removably supported via a bearing; and a bracket which supports the bearing inside a bearing box. The rotary electric machine includes: an insulating member which is mounted on an outer ring of the bearing; a metal holder which is mounted on the outer circumferential side of the insulating member; a metal ring which is mounted inside the bearing box of the bracket with a predetermined clearance with respect to the outer circumferential surface of the metal holder, and supports the bearing; and a pressing body which is mounted between the side surface of the metal holder and the side surface of the inside of the bearing box of the bracket.

According to the rotary electric machine of the first aspect of the present invention, the rotary electric machine includes: the insulating member which is mounted inside the bearing box of the bracket; the metal holder which is mounted inside the insulating member with the predetermined clearance with respect to the outer ring of the bearing, and supports the bearing; and the pressing body which is mounted between the side surface of the metal holder and the side surface of the outer ring of the bearing, whereby fluctuation of clearance due to a change in temperature can be suppressed.

Furthermore, according to the rotary electric machine of the second aspect of the present invention, the rotary electric machine includes: the insulating member which is mounted on the outer ring of the bearing; the metal holder which is mounted on the outer circumferential side of the insulating member; the metal ring which is mounted inside the bearing box of the bracket with a predetermined clearance with respect to the outer circumferential surface of the metal holder, and supports the bearing; and the pressing body which is mounted between the side surface of the metal holder and the side surface of the inside of the bearing box of the bracket, whereby fluctuation of clearance due to a change in temperature can be suppressed.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
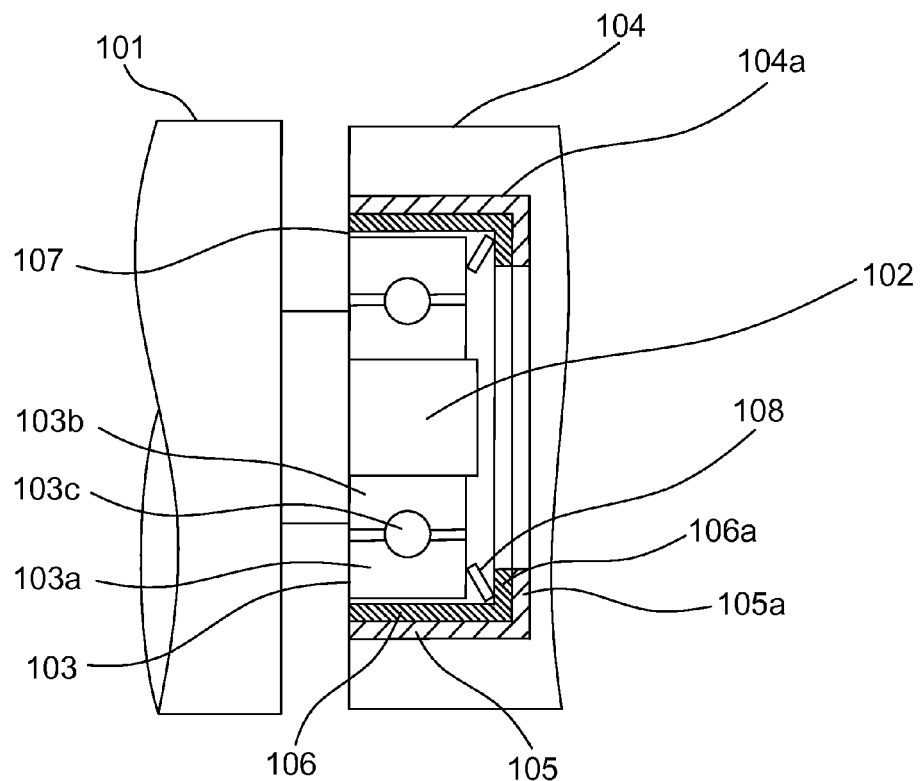
FIG. 1 is a side sectional view showing a rotary electric machine according to Embodiment 1 of the present invention.

Hereinafter, Embodiment 1 of the present invention will be described with reference to FIG. 1. FIG. 1 is a side sectional view showing a rotary electric machine according to Embodiment 1 of the present invention.

In FIG. 1, reference numeral 101 denotes a rotor which faces a stator 56 via a slight air gap; 102 denotes a shaft which is fixed to the rotor 101, and is rotatably and removably supported via a bearing 103; and 104 denotes a bracket which supports the bearing 103 inside a bearing box 104a. The bearing 103 is composed of an outer ring 103a, an inner ring 103b, and rolling elements 103c disposed in plural numbers between the outer ring 103a and the inner ring 103b.

105 denotes an insulating member made of resin, rubber, or the like, which is mounted inside the bearing box 104a of the bracket 104, and is formed in an L-shape in cross section and in a substantially cylindrical shape as a whole; and one end portion 105a is extended to the shaft 102 side. 106 denotes a metal holder which is mounted inside the insulating member 105 with a predetermined clearance 107 with respect to the outer ring 103a of the bearing 103 to support the bearing 103, and is formed in an L-shape in cross section and in a substantially cylindrical shape as a whole; and one end portion 106a is extended to the shaft 102 side. 108 denotes a pressing body such as a wave washer or a coned disc spring, which is mounted between the side surface of the one end portion 106a of the metal holder 106 and the side surface of the outer ring 103a of the bearing 103.

Press-fitting, adhesive bonding, caulking, screw clamping, and the like are conceivable for fixing the insulating member 105 inside the bearing box 104a of the bracket 104 and fixing the metal holder 106 inside the insulating member 105.

The linear expansion coefficient of the outer ring 103a of the bearing 103 is made to coincide with that of the metal holder 106 so as not to cause a change in the clearance 107 between the outer ring 103a of the bearing 103 and the metal holder 106 when there is a change in temperature. For example, both of the outer ring 103a of the bearing 103 and the metal holder 106 are made of iron-based material and their linear expansion coefficients are set to be equal.

In the case where the clearance 107 between the outer ring 103a of the bearing 103 and the metal holder 106 is large, creep is caused; and thus, axial deviation of the shaft 102 due to wear between the outer ring 103a of the bearing 103 and the inner circumferential surface of the metal holder 106 and fixing due to friction between the outer ring 103a of the bearing 103 and the inner circumferential surface of the metal holder 106 are caused.

Furthermore, vibration that is larger than that of an industrial rotary electric machine is applied on the EV or HEV electric machine; and in the case where the vibration is applied, the outer ring 103a of the bearing 103 repeatedly beats against the metal holder 106 within the clearance 107; the larger the clearance 107 is, the larger the impact due to the beating will be; and thus, axial deviation due to deformation of the inner circumferential surface of the metal holder 106 and fixing due to friction tend to be caused.

In the case where the clearance 107 between the outer ring 103a of the bearing 103 and the metal holder 106 disappears, sliding cannot be made between the boundary surface of the outer ring 103a of the bearing 103 and the metal holder 106, and the outer ring 103a of the bearing 103 is retained by the bracket 104 via the insulating member 105. In contrast, the inner ring 103b of the bearing 103 is retained by the shaft 102; and thus, in the case where the linear expansion coefficient of the shaft 102 is different from that of the bracket 104 (the shaft 102 is made of iron material and the bracket 104 is made of aluminum or the like), relative positions of the shaft 102 and the bracket 104 deviate due to a change in temperature, force to be axially sheared is applied on the outer ring 103a and the inner ring 103b of the bearing 103, and the bearing 103 is broken.

Accordingly, even when there is a change in temperature, the clearance 107 between the outer ring 103a of the bearing 103 and the inner circumferential surface of the metal holder 106 is set to be small as much as possible and the clearance 107 needs to be constantly secured.

In the aforementioned Embodiment 1, the linear expansion coefficient of the outer ring 103a of the bearing 103 is set, for example, to be equal to coincide with that of the metal holder 106, whereby when there is a change in temperature, the clearance 107 between the outer ring 103a of the bearing 103 and the inner circumferential surface of the metal holder 106 is hard to change; and therefore, the aforementioned conventional problems (the occurrence of creep due to an increase in clearance and/or breakage of the bearing due to disappearance of clearance) are not caused.

Furthermore, a load of the pressing body 108 such as the wave washer or the coned disc spring is received by the metal holder 106; and therefore, settling is smaller than the case where the load is received by the insulating member 105 (resin or rubber) and lowering of the load due to a change in compression length of the pressing body 108 such as the wave washer or the coned disc spring is not caused.

Moreover, in the case where the bearing 103 is subject to vibration and/or a radial load in a state where the clearance 107 exists on the outer circumferential surface of the outer ring 103a of the bearing 103, the bearing 103 beats against the metal holder 106 within the clearance 107; however, the metal holder 106 is hard to cause settling than the insulating member 105 (resin or rubber) and therefore axial deviation of the shaft 102 due to deformation of a supporting portion of the bearing 103 is not caused.

Additionally, the metal holder 106 is higher in processing accuracy than the insulating member 105 (resin or rubber) and accuracy of cylindricity and coaxiality of the supporting portion of the bearing 103 is good; and therefore, axial deviation of the shaft 102 is not caused.

As described above, the rotary electric machine includes: the insulating member 105 which is mounted inside the bearing box 104a of the bracket 104; the metal holder 106 which is mounted inside the insulating member 105 with a predetermined clearance 107 with respect to the outer ring 103a of the bearing 103, and supports the bearing 103; and the pressing body 108 which is mounted between the side surface of the metal holder 106 and the side surface of the outer ring 103a of the bearing 103, whereby there can be obtained the rotary electric machine capable of suppressing fluctuation of the clearance 107 due to a change in temperature.

Embodiment 2

Embodiment 2 of the present invention will be described with reference to FIG. 1. In FIG. 1, fixing of an insulating member 105 inside a bearing box 104a of a bracket 104 and fixing of a metal holder 106 inside the insulating member 105 are integrally molded by insertion molding. Similar effects to the aforementioned Embodiment 1 can be obtained in this Embodiment 2, and the following effect can be further obtained.

In the aforementioned Embodiment 1, in the case where the fixing of the insulating member 105 inside the bearing box 104a of the bracket 104 and the fixing of the metal holder 106 inside the insulating member 105 are performed by press-fitting or caulking, deformation due to the press-fitting and the caulking is caused on the inner circumferential surface of the metal holder 106. Accordingly, in consideration of the deformation of the inner circumferential surface of the metal holder 106, the clearance 107 between the outer ring 103a of the bearing 103 and the metal holder 106 needs to be controlled and the control of the clearance 107 is complicated. Furthermore, there is a concern of deterioration of the cylindricity and the coaxiality due to the deformation of the inner circumferential surface of the metal holder 106.

Furthermore, in the case where the fixing of the insulating member 105 inside the bearing box 104a of the bracket 104 and the fixing of the metal holder 106 inside the insulating member 105 are performed by bonding, there is a concern of deterioration of the coaxiality of the inner circumferential surface of the metal holder 106 with respect to the bracket 104 due to unevenness of the thickness of a bonding layer. Moreover, in the case where the fixing of the insulating member 105 inside the bearing box 104a of the bracket 104 and the fixing of the metal holder 106 inside the insulating member 105 are performed by screw clamping, there is a concern that the size of a product increases.

In this Embodiment 2, the fixing of the insulating member 105 inside the bearing box 104a of the bracket 104 and the fixing of the metal holder 106 inside the insulating member 105 are integrally molded by insertion molding, whereby there exists no deformation of the inner circumferential surface of the metal holder 106 during assembly, control of clearance 107 between an outer ring 103a of the bearing 103 and the metal holder 106 becomes easy, there is not a concern for deterioration of cylindricity and coaxiality of the inner circumferential surface of the metal holder 106, and the size of a product does not also increase.

Embodiment 3

Figure 2:
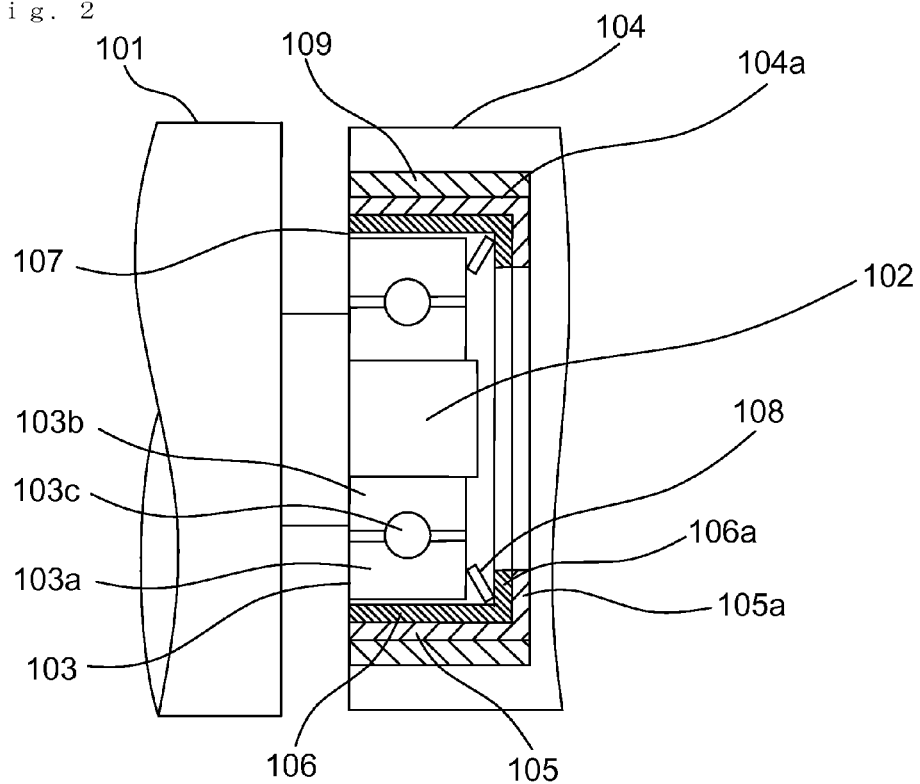
FIG. 2 is a side sectional view showing a rotary electric machine according to Embodiment 3 of the present invention.

Embodiment 3 of the present invention will be described with reference to FIG. 2. FIG. 2 is a side sectional view showing a rotary electric machine according to Embodiment 3 of the present invention.

In FIG. 2, a metal ring 109 which is made to coincide with the linear expansion coefficients of a metal holder 106 and an outer ring 103a of a bearing 103 is disposed between a bearing box 104a of a bracket 104 and an insulating member 105. For example, casting or the like is conceivable for installing the metal ring 109 on the inner circumferential surface of the bearing box 104a of the bracket 104. The insulating member 105 is fixed inside the metal ring 109 which is installed on the inner circumferential surface of the bearing box 104a of the bracket 104; the metal holder 106 is fixed inside the insulating member 105 which is fixed inside the metal ring 109; and clearance 107 is provided between the outer ring 103a of the bearing 103 and the metal holder 106. Similar effects to the aforementioned Embodiment 1 can be obtained in this Embodiment 3, and the following effect can be further obtained.

In the aforementioned Embodiment 1, the metal holder 106 is fixed inside the bearing box 104a of the bracket 104 via the insulating member 105; and thus, when a temperature is changed, if the linear expansion coefficient of the metal holder 106 is different from that of the bracket 104, the inner circumferential surface of the metal holder 106 may come under the influence of deformation of the bracket 104. In this case, the amount of deformation of the outer ring 103a of the bearing 103 is different from that of the inner circumferential surface of the metal holder 106; and thus, there is a concern that the clearance 107 between the outer ring 103a of the bearing 103 and the inner circumferential surface of the metal holder 106 changes. (In most cases, the bracket 104 is made of aluminum material and the linear expansion coefficient of the bracket 104 is different from that of the metal holder 106 and the bearing 103. Furthermore, the insulating member 105 is made of resin or rubber and is lower in rigidity than the metal holder 106; and thus, the influence of deformation due to a change in temperature of the insulating member 105 is small with respect to the inner circumferential surface of the metal holder 106.)

As its countermeasure, it is conceivable that the thickness of the metal holder 106 is set to be thick as much as possible to enhance rigidity, and thus insulating from the influence of deformation of the bracket 104 and the insulating member 105. However, this leads to an increase in press-fitting force and size-up of the product.

In this Embodiment 3, the metal ring 109 which is made to coincide with the linear expansion coefficients of the metal holder 106 and the outer ring 103a of the bearing 103 is installed on the inner circumferential surface of the bearing box 104a of the bracket 104; and thus, even when the bracket 104 is made of aluminum material, the inner circumferential surface of the bearing box 104a of the bracket 104 is p deformation due to a change in temperature of the aluminum portion by the metal ring 109, the amount of deformation due to a change in temperature of the inner circumferential surface of the metal holder 106 can be made to coincide with that of the outer ring 103a of the bearing 103, and the clearance 107 between the outer ring 103a of the bearing 103 and the metal holder 106 is hard to change due to a change in temperature.

As described above, the metal ring 109 which is made to coincide with the linear expansion coefficients of the metal holder 106 and the outer ring 103a of the bearing 103 is installed on the inner circumferential surface of the bearing box 104a of the bracket 104, whereby there can be obtained the rotary electric machine capable of suppressing fluctuation of clearance 107 due to a change in temperature.

Embodiment 4

Figure 3:
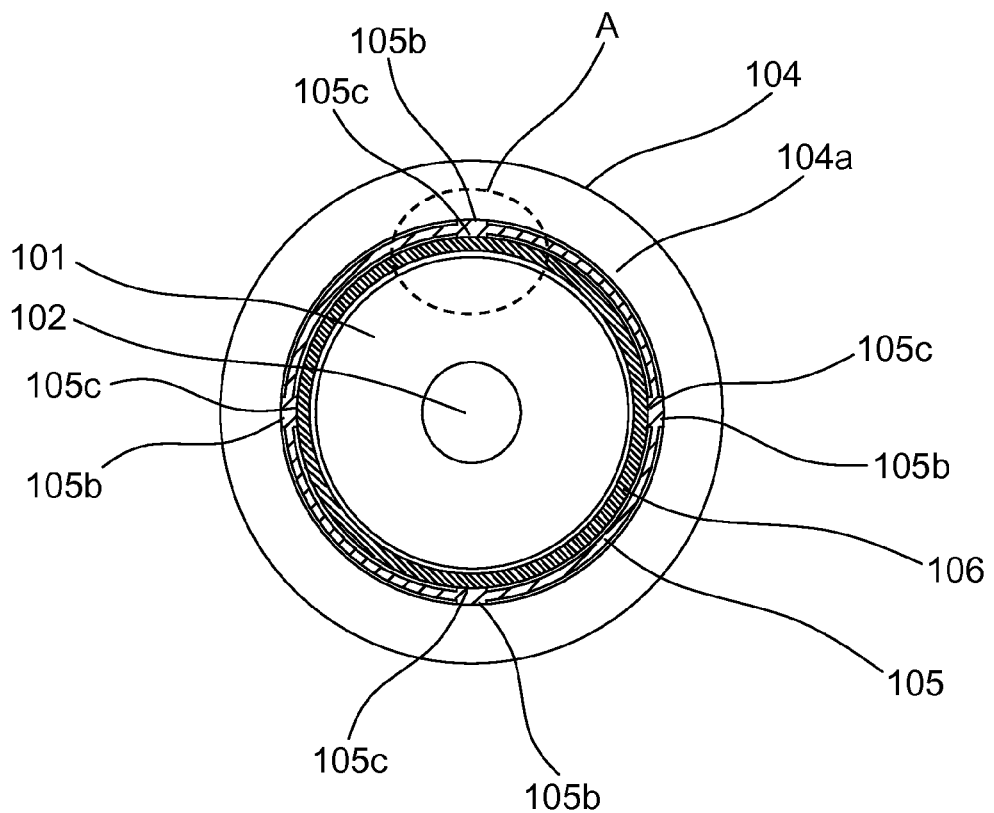
FIG. 3 is a front sectional view showing a rotary electric machine according to Embodiment 4 of the present invention.
Figure 4:
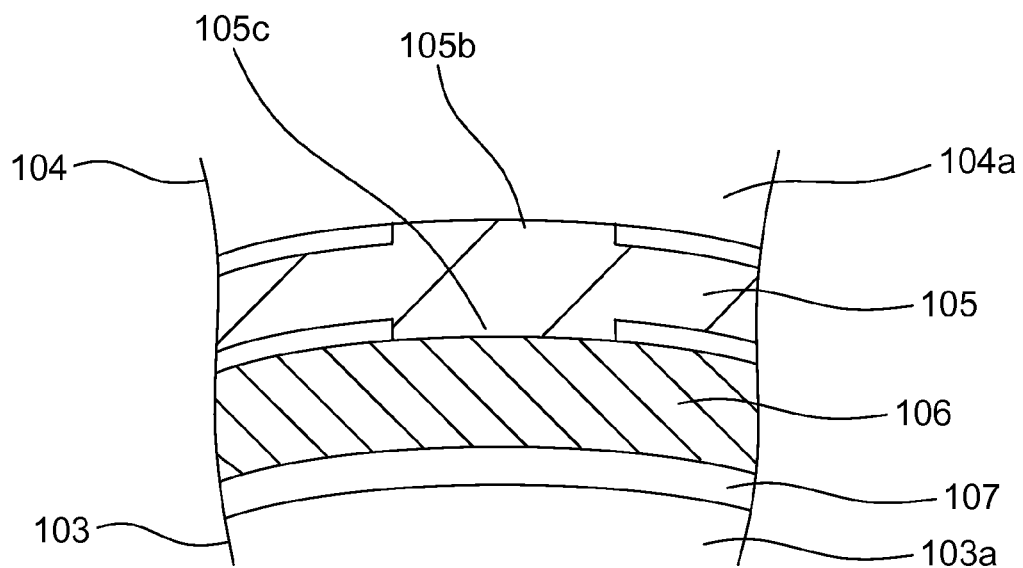
FIG. 4 is a front sectional view showing a relevant part of a rotary electric machine according to Embodiment 4 of the present invention.
Figure 5:
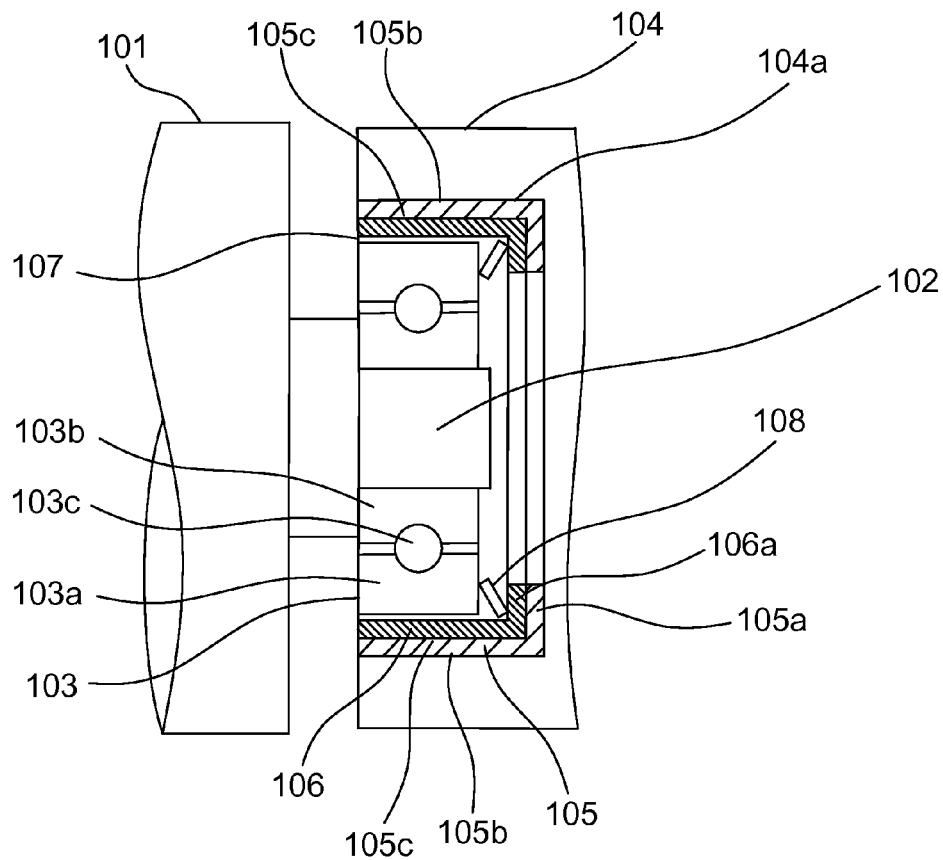
FIG. 5 is a side sectional view showing a relevant part of a rotary electric machine according to Embodiment 4 of the present invention.

Embodiment 4 of the present invention will be described with reference to FIG. 3 to FIG. 5. Then, in each of the drawings, identical or equivalent members and portions will be described with the same reference numerals assigned thereto. FIG. 3 is a front sectional view showing a rotary electric machine according to Embodiment 4 of the present invention. FIG. 4 is a front sectional view showing a relevant part of a rotary electric machine according to Embodiment 4 of the present invention. FIG. 5 is a side sectional view showing a relevant part of a rotary electric machine according to Embodiment 4 of the present invention.

In each of these drawings, in the case where an insulating member 105 is fixed to the inner circumferential surface of a bearing box 104a of a bracket 104 and a metal holder 106 is fixed to the inner circumferential surface of the insulating member 105, a press-fitting portion of the inner circumferential surface of the bearing box 104a of the bracket 104 and the insulating member 105 and a press-fitting portion of the insulating member 105 and the metal holder 106 are partially press-fitted. More specifically, press-fitting protrusion portions 105b, 105c, each of which serves as a part of the insulating member 105, are press-fitted to the inner circumferential surface of the bearing box 104a of the bracket 104 and to the outer circumferential surface of the metal holder 106. Similar effects to the aforementioned Embodiment 1 can be obtained in this Embodiment 4, and the following effect can be further obtained.

In the aforementioned Embodiment 1, in the case where the whole of the inner circumferential surface of the bearing box 104a of the bracket 104 and the insulating member 105 and the whole of the insulating member 105 and the metal holder 106 are press-fitted, deformation of the inner circumferential surface of the metal holder 106 is caused depending on a press-fitting allowance. In order to set clearance 107 between the outer ring 103a of the bearing 103 and the metal holder 106 to be an optimum value, a highly accurate press-fitting allowance needs to be controlled.

In Embodiment 4, the press-fitting portion of the inner circumferential surface of the bearing box 104a of the bracket 104 and the insulating member 105 and the press-fitting portion of the insulating member 105 and the metal holder 106 are partially press-fitted. More specifically, a part of the insulating member 105, for example, as shown in FIG. 3, the press-fitting protrusion portions 105b, 105c are provided at four points in a vertical direction and in a horizontal direction with respect to a circumferential direction, the press-fitting protrusion portions 105b of the insulating member 105 are press-fitted to the inner circumferential surface of the bearing box 104a of the bracket 104, and the press-fitting protrusion portions 105c of the insulating member 105 are press-fitted to the outer circumferential surface of the metal holder 106; and thus, deformation of the inner circumferential surface of the metal holder 106 can be suppressed as much as possible and a highly accurate press-fitting allowance does not need to be controlled.

Furthermore, the shape of the partial press-fitting portions shows the case of four points in the vertical direction and in the horizontal direction with respect to the circumferential direction, but not limited to this. If in the case of three or more points with respect to the circumferential direction, similar effects are exhibited. (If in the case of three or more points, the center of the bearing box 104a, the insulating member 105, and the metal holder 106 is determined.)

Embodiment 5

Figure 6:
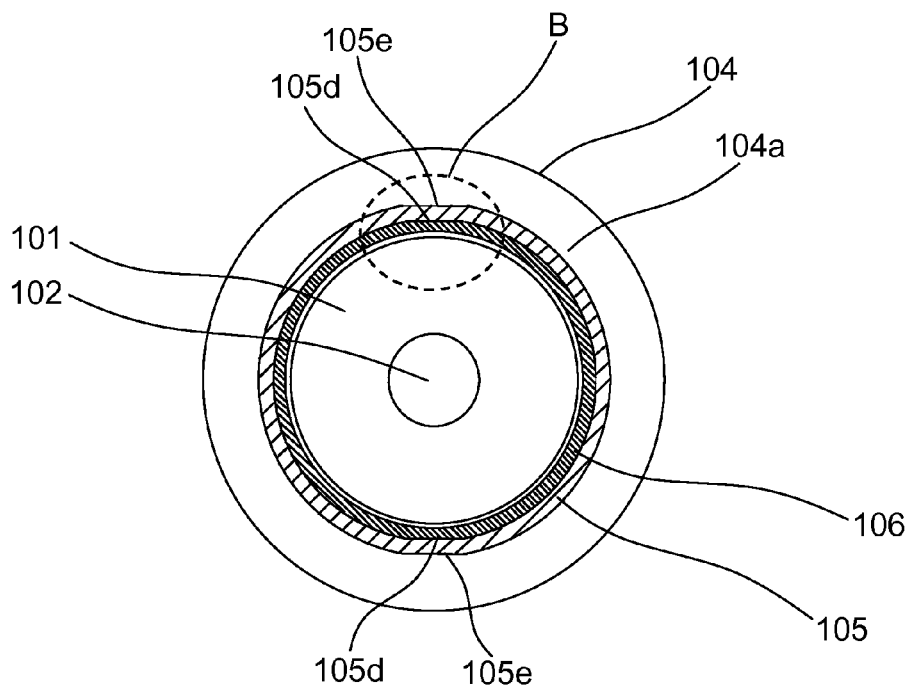
FIG. 6 is a front sectional view showing a rotary electric machine according to Embodiment 5 of the present invention.
Figure 7:
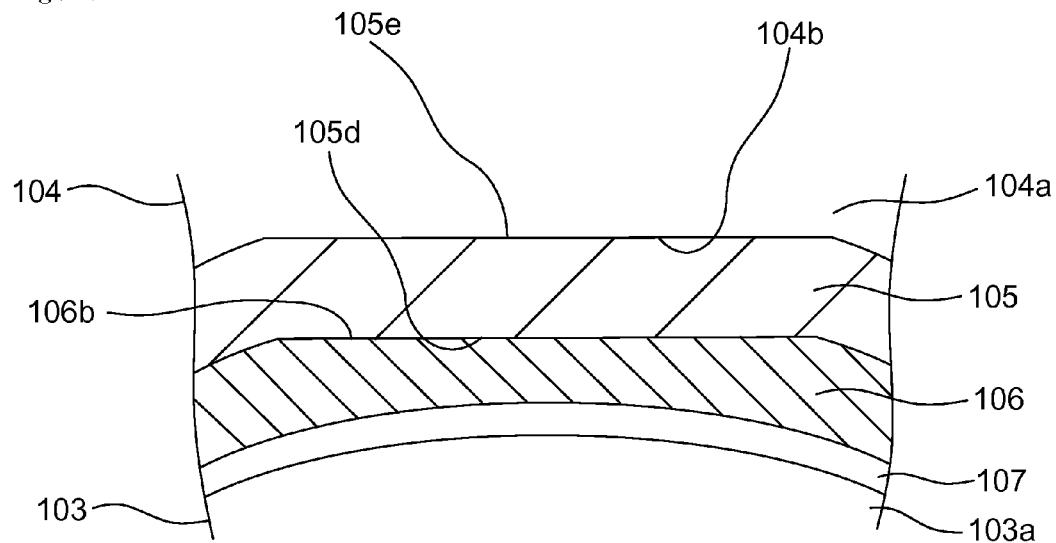
FIG. 7 is a front sectional view showing a relevant part of a rotary electric machine according to Embodiment 5 of the present invention.
Figure 8:
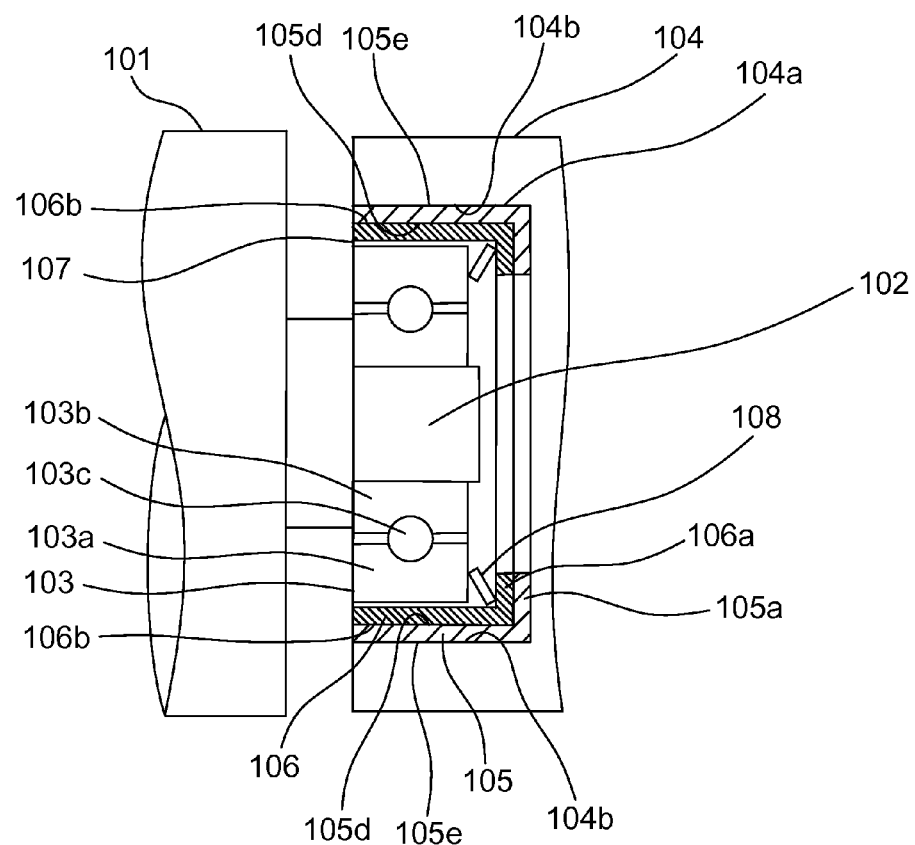
FIG. 8 is a side sectional view showing a relevant part of a rotary electric machine according to Embodiment 5 of the present invention.

Embodiment 5 of the present invention will be described with reference to FIG. 6 to FIG. 8. Then, in each of the drawings, identical or equivalent members and portions will be described with the same reference numerals assigned thereto. FIG. 6 is a front sectional view showing a rotary electric machine according to Embodiment 5 of the present invention. FIG. 7 is a front sectional view showing a relevant part of the rotary electric machine according to Embodiment 5 of the present invention. FIG. 8 is a side sectional view showing a relevant part of the rotary electric machine according to Embodiment 5 of the present invention.

In each of these drawings, in the case where an insulating member 105 is fixed to the inner circumferential surface of a bearing box 104a of a bracket 104 and a metal holder 106 is fixed to the inner circumferential surface of the insulating member 105, a fixing portion of the inner circumferential surface of the bearing box 104a of the bracket 104 and the insulating member 105 and a fixing portion of the insulating member 105 and the metal holder 106 are each formed in a non-cylindrical shape. More specifically, a part 104b of the inside of the bearing box 104a of the bracket 104 and a part 106b of the outer circumference of the metal holder 106 are each formed in a non-cylindrical shape. The outer circumference 105e and the inner circumference 105d of the insulating member 105, which come face to face with the part 104b of the inside of the bearing box 104a and the part 106b of the outer circumference of the of the metal holder 106, respectively, are each formed in a non-cylindrical shape. (The part 104b of the inside of the bearing box 104a does not need to come face to face with the part 106b of the outer circumference of the metal holder 106.)

In the aforementioned Embodiment 1, the fixing portion of the inner circumferential surface of the bearing box 104a of the bracket 104 and the insulating member 105 and the fixing portion of the insulating member 105 and the metal holder 106 are each formed in the cylindrical shape; and thus, the insulating member 105 and the metal holder 106 are separated from the inner circumferential surface of the bearing box 104a of the bracket 104 due to vibration or the like and the insulating member 105 and the metal holder 106 may have the potential to rotate.

In this Embodiment 5, the part 104b of the inside of the bearing box 104a of the bracket 104 and the part 106b of the outer circumference of the metal holder 106 are each formed in a non-cylindrical shape. The outer circumference 105e and the inner circumference 105d of the insulating member 105, which come face to face with the part 104b of the inside of the bearing box 104a and the part 106b of the outer circumference of the of the metal holder 106, respectively, are each formed in a non-cylindrical shape (the part 104b of the inside of the bearing box 104a does not need to come face to face with the part 106b of the outer circumference of the metal holder 106), whereby a rotation stopping function exists and the insulating member 105 and the metal holder 106 do not rotate by separating the insulating member 105 and the metal holder 106 from the inner circumferential surface of the bearing box 104a of the bracket 104.

Furthermore, the non-cylindrical shape portion shows the case of two points in the vertical direction with respect to a circumferential direction, but not limited to this. If in the case of one or more points with respect to the circumferential direction, similar effects are exhibited. (If in the case of one or more points, a rotation stopping effect exists.)

Embodiment 6

Figure 9:
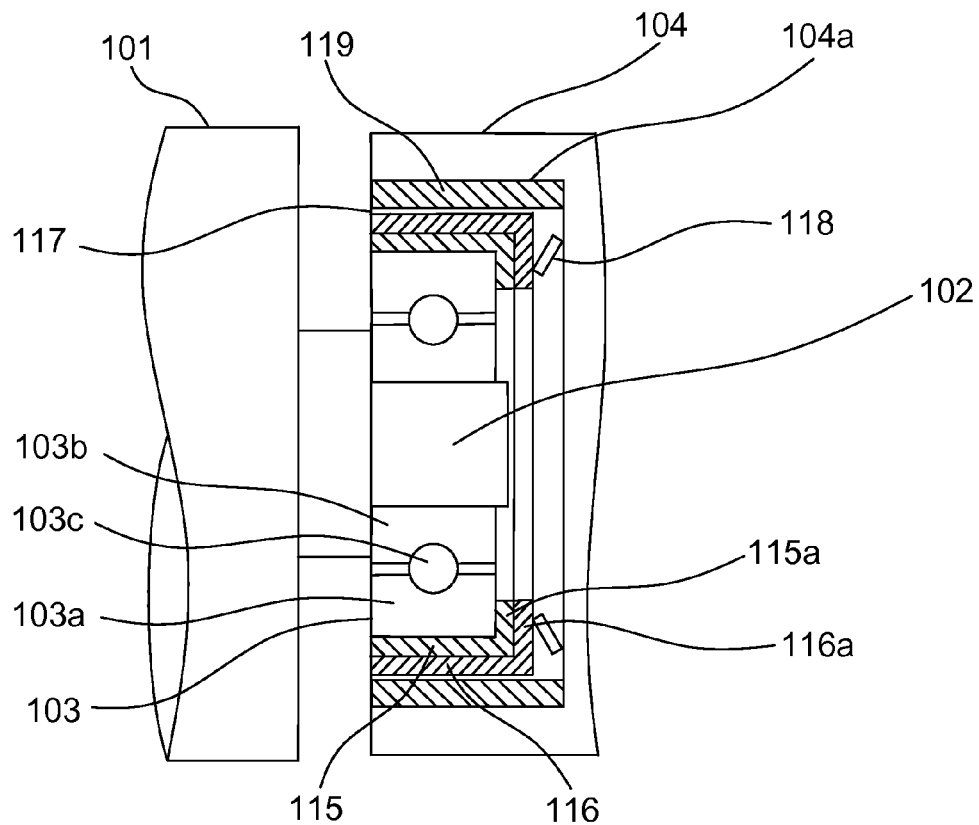
FIG. 9 is a side sectional view showing a rotary electric machine according to Embodiment 6 of the present invention.
Figure 10:
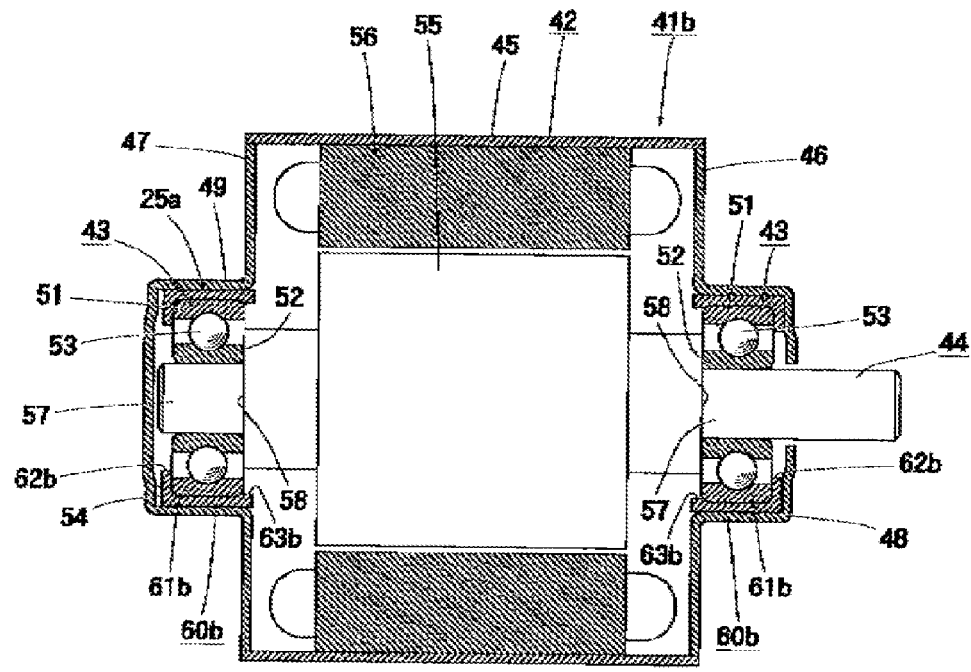
FIG. 10 is a side sectional view showing a conventional rotary electric machine.
Figure 11:
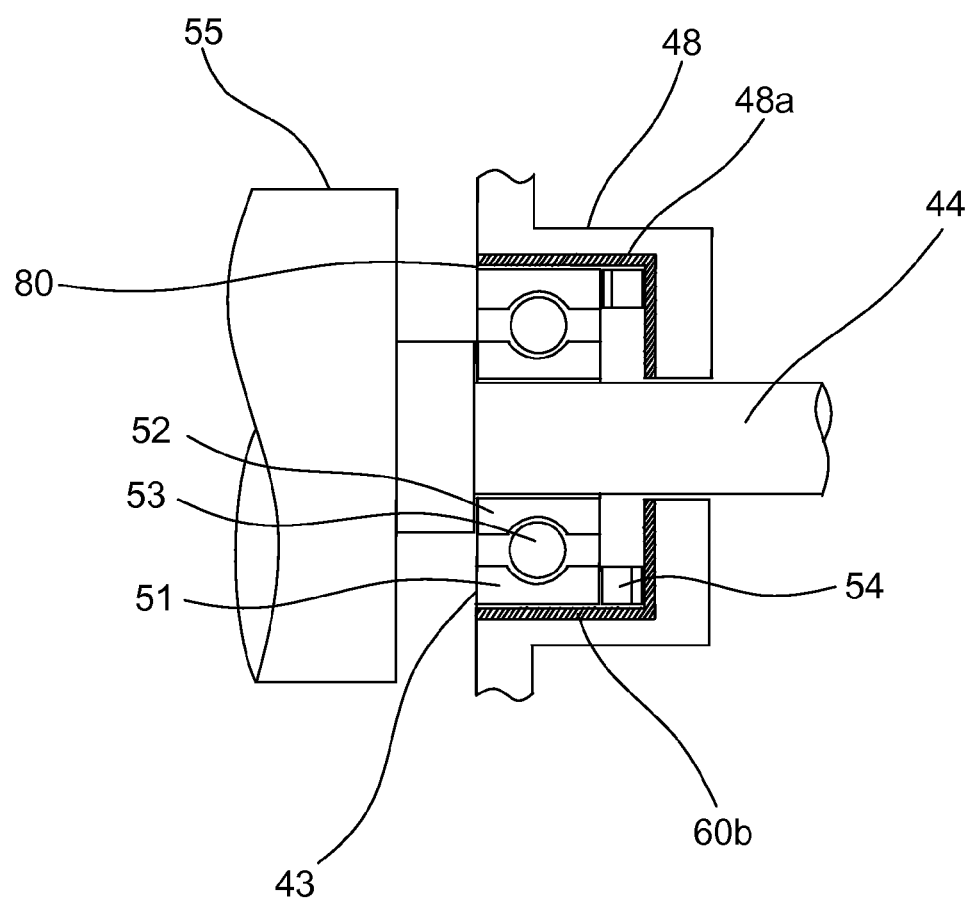
FIG. 11 is a side sectional view showing a conventional rotary electric machine.

Embodiment 6 of the present invention will be described with reference to FIG. 9. FIG. 9 is a side sectional view showing a rotary electric machine according to Embodiment 6 of the present invention.

In FIG. 9, reference numeral 101 denotes a rotor, 102 denotes a shaft, 103 denotes a bearing, 103a denotes an outer ring, 103b denotes an inner ring, 103c denotes rolling elements, 104 denotes a bracket, and 104a denotes a bearing box; and the configuration thereof is similar to that of the aforementioned Embodiment 1.

115 denotes an insulating member made of resin, rubber, or the like, which is mounted on the outer ring 103a of the bearing 103, and is formed in an L-shape in cross section and in a substantially cylindrical shape as a whole; and one end portion 115a is extended to the shaft 102 side on the side surface of the outer ring 103a of the bearing 103. 116 denotes a metal holder which is mounted on the outer circumferential side of the insulating member 115 and is formed in an L-shape in cross section and in a substantially cylindrical shape as a whole; and one end portion 116a is extended to the shaft 102 side along the one end portion 115a of the insulating member 115. 119 denotes a metal ring which is mounted inside the bearing box 104a of the bracket 104 with a predetermined clearance 117 with respect to the outer circumferential surface of the metal holder 116 and supports the bearing 103. 118 denotes a pressing body such as a wave washer or a coned disc spring, which is mounted between the side surface of the one end portion 116a of the metal holder 116 and the side surface of the inside of the bearing box 104a of the bracket 104. Similar effects to the aforementioned Embodiment 1 can be obtained in this Embodiment 6, and the following effect can be further obtained.

In the aforementioned Embodiment 1, the insulating member 105 is fixed inside the bearing box 104a of the bracket 104 and the metal holder 106 is fixed inside the insulating member 105; however, the bracket 104 is larger than the bearing 103 and assembly work is extensive.

In this Embodiment 6, the insulating member 115 is fixed to the outer ring 103a of the bearing 103 and the metal holder 116 is fixed on the outer circumferential side of the insulating member 115; and thus, work can be compact and therefore workability is improved. Furthermore, in this Embodiment 6, the clearance 117 on the outer circumferential side of the metal holder 116 is set to be small as much as possible and the clearance 117 needs to be constantly obtained even when there is a change in temperature. In the case where the linear expansion coefficient of the bracket 104 is different from that of the metal holder 116, the metal ring 119 is installed (casted) on the inner circumferential surface of the bearing box 104a of the bracket 104, and the linear expansion coefficients of the metal holder 116 and the outer ring 103a of the bearing 103 are made to coincide with that of the metal ring 119; and thus, the clearance 117 between the outer circumferential side of the metal holder 116 and the inner circumferential surface of the metal ring 119 can be obtained.

As described above, the rotary electric machine includes: the insulating member 115 which is mounted on the outer ring 103a of the bearing 103; the metal holder 116 which is mounted on the outer circumferential side of the insulating member 115; the metal ring 119 which is mounted inside the bearing box 104a of the bracket 104 with the predetermined clearance 117 with respect to the outer circumferential surface of the metal holder 116, and supports the bearing 103; and the pressing body 118 such as the wave washer or the coned disc spring, which is mounted between the side surface of the one end portion 116a of the metal holder 116 and the side surface of the inside of the bearing box 104a of the bracket 104, whereby there can be obtained a rotary electric machine capable of suppressing fluctuation of the clearance 117 due to a change in temperature.

Incidentally, in the present invention, the respective embodiments can be freely combined and appropriately changed in shape or omitted within the scope of the present invention.

The present invention is suitable for achieving a rotary electric machine capable of suppressing fluctuation of clearance due to a change in temperature.

While the presently preferred embodiments of the present invention have been shown and described. It is to be understood that these disclosures are for the purpose of illustration and that various changes and modifications may be made without departing from the scope of the invention as set forth in the appended claims.

What is claimed is:
1. A rotary electric machine including:
a stator around which a coil is wound;
a frame which fixes said stator;
a rotor which faces said stator via a slight air gap;
a shaft which is fixed to said rotor and is rotatably and removably supported via a bearing; and
a bracket which supports said bearing inside a bearing box,
said rotary electric machine comprising:
an insulating member which is mounted inside said bearing box of said bracket;
a metal holder which is mounted inside said insulating member with a predetermined clearance with respect to an outer ring of said bearing, and supports said bearing; and
a pressing body which is mounted between the side surface of said metal holder and the side surface of said outer ring of said bearing.

2. The rotary electric machine according to claim 1, wherein said insulating member and said metal holder are mounted inside said bearing box of said bracket by insertion molding.

3. The rotary electric machine according to claim 2, wherein the linear expansion coefficient of said metal holder is equal to the linear expansion coefficient of said outer ring of said bearing.

4. The rotary electric machine according to claim 3, further comprising a metal ring, which is made to coincide with the linear expansion coefficients of said metal holder and said outer ring of said bearing, is disposed between said bearing box of said bracket and said insulating member.

5. The rotary electric machine according to claim 3, wherein a part of three or more points of said insulating member is press-fitted to the inside of said bearing box of said bracket and to the outer circumference portion of said metal holder.

6. The rotary electric machine according to claim 3, wherein a part of one or more points of the inside of said bearing box of said bracket and a part of one or more points of the outer circumference of said metal holder are each formed in a non-cylindrical shape; and
the outer circumference of said insulating member, which comes face to face with the part of the inside of said bearing box, and the inner circumference of said insulating member, which comes face to face with the part of the outer circumference of said metal holder are each formed in a non-cylindrical shape.

7. The rotary electric machine according to claim 2, further comprising a metal ring, which is made to coincide with the linear expansion coefficients of said metal holder and said outer ring of said bearing, is disposed between said bearing box of said bracket and said insulating member.

8. The rotary electric machine according to claim 2, wherein a part of three or more points of said insulating member is press-fitted to the inside of said bearing box of said bracket and to the outer circumference portion of said metal holder.

9. The rotary electric machine according to claim 2, wherein a part of one or more points of the inside of said bearing box of said bracket and a part of one or more points of the outer circumference of said metal holder are each formed in a non-cylindrical shape; and
the outer circumference of said insulating member, which comes face to face with the part of the inside of said bearing box, and the inner circumference of said insulating member, which comes face to face with the part of the outer circumference of said metal holder are each formed in a non-cylindrical shape.

10. The rotary electric machine according to claim 1, wherein the linear expansion coefficient of said metal holder is equal to the linear expansion coefficient of said outer ring of said bearing.

11. The rotary electric machine according to claim 10, further comprising a metal ring, which is made to coincide with the linear expansion coefficients of said metal holder and said outer ring of said bearing, is disposed between said bearing box of said bracket and said insulating member.

12. The rotary electric machine according to claim 10, wherein a part of three or more points of said insulating member is press-fitted to the inside of said bearing box of said bracket and to the outer circumference portion of said metal holder.

13. The rotary electric machine according to claim 10,
wherein a part of one or more points of the inside of said bearing box of said bracket and a part of one or more points of the outer circumference of said metal holder are each formed in a non-cylindrical shape; and
the outer circumference of said insulating member, which comes face to face with the part of the inside of said bearing box, and the inner circumference of said insulating member, which comes face to face with the part of the outer circumference of said metal holder are each formed in a non-cylindrical shape.

14. The rotary electric machine according to claim 1,
further comprising a metal ring, which is made to coincide with the linear expansion coefficients of said metal holder and said outer ring of said bearing, is disposed between said bearing box of said bracket and said insulating member.

15. The rotary electric machine according to claim 14,
wherein a part of three or more points of said insulating member is press-fitted to the inside of said bearing box of said bracket and to the outer circumference portion of said metal holder.

16. The rotary electric machine according to claim 14,
wherein a part of one or more points of the inside of said bearing box of said bracket and a part of one or more points of the outer circumference of said metal holder are each formed in a non-cylindrical shape; and
the outer circumference of said insulating member, which comes face to face with the part of the inside of said bearing box, and the inner circumference of said insulating member, which comes face to face with the part of the outer circumference of said metal holder are each formed in a non-cylindrical shape.

17. The rotary electric machine according to claim 1,
wherein a part of three or more points of said insulating member is press-fitted to the inside of said bearing box of said bracket and to the outer circumference portion of said metal holder.

18. The rotary electric machine according to claim 17,
wherein a part of one or more points of the inside of said bearing box of said bracket and a part of one or more points of the outer circumference of said metal holder are each formed in a non-cylindrical shape; and
the outer circumference of said insulating member, which comes face to face with the part of the inside of said bearing box, and the inner circumference of said insulating member, which comes face to face with the part of the outer circumference of said metal holder are each formed in a non-cylindrical shape.

19. The rotary electric machine according to claim 1,
wherein a part of one or more points of the inside of said bearing box of said bracket and a part of one or more points of the outer circumference of said metal holder are each formed in a non-cylindrical shape; and
the outer circumference of said insulating member, which comes face to face with the part of the inside of said bearing box, and the inner circumference of said insulating member, which comes face to face with the part of the outer circumference of said metal holder are each formed in a non-cylindrical shape.

20. A rotary electric machine including:
a stator around which a coil is wound;
a frame which fixes said stator;
a rotor which faces said stator via a slight air gap;
a shaft which is fixed to said rotor and is rotatably and removably supported via a bearing; and
a bracket which supports said bearing inside a bearing box,
said rotary electric machine comprising:
an insulating member which is mounted on an outer ring of said bearing;
a metal holder which is mounted on the outer circumferential side of said insulating member;
a metal ring which is mounted inside said bearing box of said bracket with a predetermined clearance with respect to the outer circumferential surface of said metal holder, and supports said bearing; and
a pressing body which is mounted between the side surface of said metal holder and the side surface of the inside of said bearing box of said bracket.

* * * * *